H. GIBBS.
HOSE CLAMP.
APPLICATION FILED JAN. 2, 1913.

1,096,503.

Patented May 12, 1914.

Witnesses:

Inventor:
Henry Gibbs

UNITED STATES PATENT OFFICE.

HENRY GIBBS, OF CHICAGO, ILLINOIS, ASSIGNOR TO W. D. ALLEN MANUFACTURING COMPANY, OF CHICAGO, ILLINOIS, A CORPORATION.

HOSE-CLAMP.

1,096,503. Specification of Letters Patent. Patented May 12, 1914.

Application filed January 2, 1913. Serial No. 739,876.

*To all whom it may concern:*

Be it known that I, HENRY GIBBS, a citizen of the United States, and a resident of the city of Chicago, county of Cook, and State of Illinois, have invented certain new and useful Improvements in Hose-Clamps, of which I do declare the following to be a full, clear, and exact description, reference being had to the accompanying drawing, forming part of this specification.

The present invention has relation particularly to that class of hose clamps designed for attaching the ends of rubber hose to the members whereby sections of hose are connected together or to a hose nozzle.

The invention consists in the construction of the device hereinafter described, illustrated in the accompanying drawing and particularly defined in the claim at the end of this specification.

Figure 1:
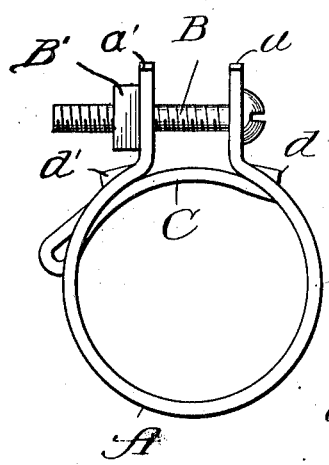
Figure 2:
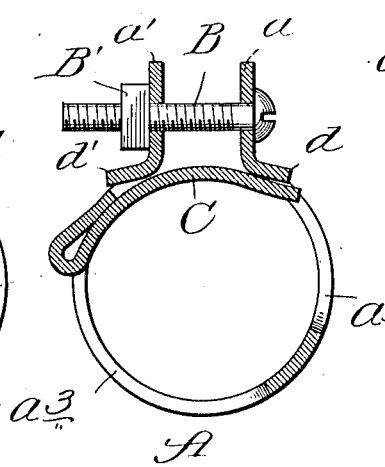
Figure 3:
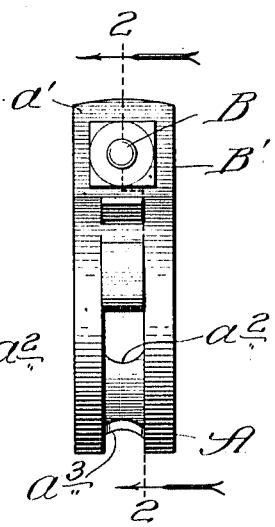
Figure 4:
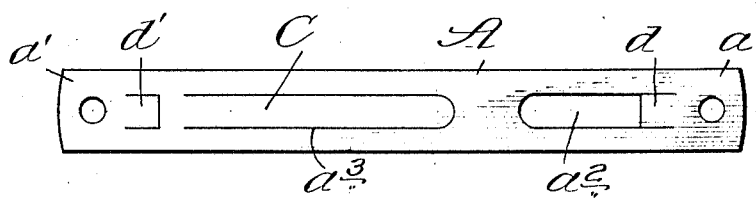

Figure 1 is a view in side elevation of a hose clamp embodying my invention. Fig. 2 is a view in central vertical section on line 2—2 of Fig. 3. Fig. 3 is a view in end elevation. Fig. 4 is a view showing a blank from which the band is formed.

My improved hose clamp is formed from a strip of sheet metal A which by means of suitable dies has its ends bent outwardly, as shown, to form ears $a$, $a'$, these ears being perforated to receive a headed through bolt B upon the free end of which is mounted a nut $B'$.

As shown, the body of the band is formed with cut-away spaces $a^2$, $a^3$. The metal cut from the space $a^3$ of the body A is bent to form the tongue C that will span the space between the ends of the clamp, the free end of the tongue C extending into the cut-away space $a^2$ of the body. The metal at the end of the cut-away space $a^2$ nearest the offset end $a$ of the flange, is forced outward to form a square ended lip or shoulder $d$ and, similarly, a short tongue or lip of metal $d'$ is forced outward from the body of the band adjacent the inner portion of the offset end $a'$ of the band. The forcing out of the shoulder $d$ forms a groove or channel that receives the free end of the tongue C and guides this tongue as the ends of the band are drawn together about the periphery of the hose. The square ends of the lips or shoulders $d$ and $d'$ serve as effective means for engagement by the ends of the usual vise jaws whereby the clamp is tightened about the hose, in manner well understood.

My improved band forms an exceedingly cheap, simple and effective means for clamping sections of hose upon their couplings.

Having thus described my invention, what I claim as new, and desire to secure by Letters Patent, is:—

A single piece hose clamp consisting of a sheet metal band having its ends bent to form oppositely disposed ears, a tongue integrally connected to one end portion of said band midway between its side edges and adjacent one of said ears, said tongue being reversely bent to bridge the gap between said ears, said tongue having an outturned free end, and the opposite end portion of said band having a longitudinal slot formed therein with an outwardly bent square-ended lip at the end of said slot next to the adjacent ear, said slot forming a channel through which the upturned end of said tongue extends, and a corresponding, oppositely disposed square-ended lip between the other ear and the base of said tongue, substantially as described.

HENRY GIBBS.

Witnesses:
 ELEANOR HAGENOW,
 KATHARINE GERLACH.